United States Patent [19]

Munjal et al.

[11] Patent Number: 5,200,496
[45] Date of Patent: Apr. 6, 1993

[54] PROCESS FOR PREPARING POLYCARBONATE HAVING REDUCED CARBONATE BYPRODUCT CONTENT

[75] Inventors: Sarat Munjal; Thomas M. Wardlow; Andrew F. Hall, all of Lake Jackson

[73] Assignee: The Dow Chemical Company, Midland, Mich.

[21] Appl. No.: 724,642

[22] Filed: Jul. 2, 1991

[51] Int. Cl.$^5$ .............................................. C08G 64/20
[52] U.S. Cl. .................................. 528/198; 528/176; 528/179; 528/182; 528/196; 528/199; 528/371
[58] Field of Search ............... 528/198, 199, 371, 176, 528/179, 182, 196

[56] References Cited

U.S. PATENT DOCUMENTS

| | | | |
|---|---|---|---|
| 2,970,131 | 1/1961 | Moyer et al. | 260/47 |
| 3,026,298 | 3/1962 | Lee et al. | 260/47 |
| 3,160,606 | 12/1964 | Dietrich et al. | 260/47 |
| 3,530,094 | 9/1970 | Schnell et al. | 260/47 |
| 4,384,108 | 5/1983 | Campbell et al. | 528/196 |
| 4,431,793 | 2/1984 | Rosenquist | 528/198 |
| 4,448,953 | 5/1984 | Rosenquist et al. | 528/198 |
| 4,471,104 | 9/1984 | Krishnan et al. | 528/199 |
| 4,503,213 | 3/1985 | Krishnan et al. | 528/199 |
| 4,737,573 | 4/1988 | Silva et al. | 528/371 |
| 4,743,676 | 5/1988 | Silva et al. | 528/371 |
| 4,864,011 | 9/1989 | Bussink et al. | 528/198 |
| 4,939,230 | 7/1990 | Munjal et al. | 528/198 |
| 5,034,505 | 7/1991 | Silva et al. | 528/198 |

FOREIGN PATENT DOCUMENTS

| | | |
|---|---|---|
| 0251586 | 6/1987 | European Pat. Off. |
| 1242620 | 9/1989 | Japan |

*Primary Examiner*—Harold D. Anderson
*Attorney, Agent, or Firm*—John A. Langworthy

[57] ABSTRACT

A process for preparing polycarbonate wherein a chain terminator is added to the reaction mixture after substantial reaction of a carbonate precursor, a coupling catalyst is added to the reaction mixture after substantial reaction of the chain terminator, and base is added to the reaction mixture after reaction mixture after substantial reaction of the chain terminator in an amount sufficient to give a negative chloroformate test.

10 Claims, No Drawings

PROCESS FOR PREPARING POLYCARBONATE HAVING REDUCED CARBONATE BYPRODUCT CONTENT

FIELD OF THE INVENTION

This invention relates to a prices for reducing the carbonate byproduct content and polydispersity in polycarbonate, and to the polycarbonate produced thereby.

BACKGROUND OF THE INVENTION

This invention relates to polycarbonate, and the production thereof, where a chain terminator has been utilized in the manufacturing process, and to articles fabricated from such polycarbonate.

It is known to produce polycarbonate by the reaction of a dihydroxy compound, particularly a diphenol, with a carbonic acid derivative such as phosgene. A chain terminator is often added to the reaction mixture for the purpose of regulating the molecular weight of the polycarbonate product. When used, a chain terminator is typically included in the monomer mix which is initially charged to the reaction vessel, and the dihydroxy compound and chain terminator are consequently both present in the reaction mixture when it is contacted with the carbonic acid derivative.

In such a method of producing polycarbonate, molecules of varying degrees of polymerization are obtained. The chain terminator is useful for the purpose of attempting to confine a large percentage of the molecules to a preselected molecular weight range. However, even when a terminator is used according to the practice in the art as described above, not all molecules conform to the preselected weight range, and frequently some molecules of extremely low molecular weight (carbonate byproducts) are nevertheless produced.

Carbonate byproducts, being the smallest of the molecules resulting from the production of polycarbonate, have the lowest respective boiling points and are therefore the most likely to exist in vapor phase. The presence of carbonate byproducts in vapor phase becomes a consideration when polycarbonate is, for example, being extruded, molded, or heated for any other purpose. Accordingly, it would be desirable to prevent or limit the formation of carbonate byproducts in polycarbonate, and obtain a polycarbonate product wherein the greatest possible percentage of the molecules fall within the preselected molecular weight range which it is the purpose of a chain terminator to achieve.

For the purpose of reducing the formation of carbonate byproducts in polycarbonate, U.S. Pat. No. 4,939,230 (which is incorporated herein in its entirety) discloses the general procedure of withholding addition of a chain terminator to a polycarbonate reaction mixture until reaction of the dihydroxy compound and carbonic acid derivative has proceeded to completion. However, additional process steps concerning the timing of admixture of base or a coupling catalyst with the reaction mixture have been found to be a valuable refinement of that general procedure.

SUMMARY OF THE INVENTION

This invention involves a process for preparing polycarbonate comprising (a) forming a carbonate oligomer by contacting a carbonate precursor with a solution containing a dihydroxy compound, water, a solvent capable of dissolving a carbonate precursor, and a base: (b) admixing a chain terminator with said solution after said carbonate precursor has been substantially completely reacted with said solution: (c) forming a polycarbonate by admixing a coupling catalyst with said solution after said chain terminator has been substantially completely reacted with said solution, (d) recovering polycarbonate from said solution.

In another aspect, this invention involves a process for preparing polycarbonate comprising (a) forming a carbonate oligomer by contacting a carbonate precursor with a solution containing a dihydroxy compound, water, a solvent capable of dissolving a carbonate precursor, and a base; (b) admixing a chain terminator with said solution after said carbonate precursor has been substantially completely reacted with said solution: (c) forming a polycarbonate by admixing with said solution, after said chain terminator has been substantially completely reacted therewith, sufficient base to impart to said solution a negative chloroformate test: (d) recovering a polycarbonate product from said solution.

In yet another aspect, this invention involves a process for preparing polycarbonate comprising (a) forming a carbonate oligomer by contacting a carbonate precursor with a solution containing a dihydroxy compound, water, and a base: (b) admixing a solvent capable of dissolving a carbonate oligomer with said solution after said carbonate precursor has been substantially completely reacted with said solution: (c) admixing a chain terminator with said solution after dissolution of said carbonate oligomer: (d) forming a polycarbonate by admixing a coupling catalyst with said solution after said chain terminator has been substantially completely reacted with said solution: (e) recovering polycarbonate from said solution.

The process of this invention is useful for producing a polycarbonate which is characterized by desirably low levels of carbonate byproducts. The presence of such carbonate byproducts often causes partial plugging of mold vents and thus uneven flow of molten extrudate into all parts of a mold cavity, leaving imperfections in finished polycarbonate articles made, for example, by injection molding. Also by the process of this invention, a polycarbonate having a desirably low polydispersity is obtained.

The polycarbonate produced by the process of this invention may be employed, for example, as a membrane, film, fiber, extruded sheet, multi-layer laminate or molded or shaped article of virtually any variety. Such molded or shaped articles are particularly adapted for use in the automotive and electronics industries, for example as information storage media such as a compact disc. When softened by the application of heat, the polycarbonate of this invention may be readily formed or molded using conventional techniques such as vacuum- or thermo-forming, calendering, or compression, injection, extrusion or blow molding techniques, alone or in combination, for fabrication into any of the items mentioned above. A polycarbonate can also be compounded with one or more other organic or inorganic substances.

DETAILED DESCRIPTION OF THE INVENTION

In the process of this invention—the process for making the polycarbonate of this invention—polycarbonate can be prepared by the reaction of a dihydroxy compound and a carbonate precursor such as a carbonic acid derivative, a haloformate or a carbonate ester. These components are usually reacted by means of the phase boundary process in which the dihydroxy compound is dissolved and deprotonated in an aqueous alkaline solution and the carbonate precursor is dissolved in an organic solvent. The aqueous alkaline solution can be formed from a base which may be selected from those including the alkali metal and alkaline earth metal phosphates, bicarbonates, oxides and hydroxides. A preferred base for such purpose is a caustic soda such as NaOH.

These components may be reacted in a mixture which is typically prepared initially from the dihydroxy compound, water and a non-reactive, immiscible organic solvent selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is added to the reaction mixture to adjust its pH to a level at which the dianion of the dihydroxy compound is formed. A reducing agent such as sodium sulfite or sodium dithionite can also be advantageously added to the reaction mixture. Optionally, the solvent may be added later so that a carbonate precursor is added in the absence of a solvent.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. The mixture is agitated in a manner which is sufficient to disperse or suspend droplets of the solvent containing the carbonate precursor in the aqueous alkaline solution. Reaction at the interface of the organic and aqueous phases created by such agitation yields the monomeric bisester of the dihydroxy compound [hereinafter referred to as the "bis(carbonate precursor)ester of the dihydroxy compound"]. For example, if the carbonate precursor is a carbonyl halide such as phosgene, the products of this initial phase of the process are predominantly monomers in dichloroformate form accompanied by lesser amounts of oligomers which are either mono- or dichloroformates or bisphenolate ions.

The molecular weight of the polycarbonate can be controlled by addition to the reaction mixture of a chain terminator which may be selected from monofunctional substances such as phenols, alcohols, amines, imides, carbonic acid chlorides, sulfonic acid chlorides, metallic sulfites, trialkyl- or triarylsilanols, monohalosilanes, aniline or phenylchlorocarbonates. Of these, phenol and derivatives thereof such as p-(t-butyl)phenol, and 4-(1,1,3,3-tetramethyl-butyl)-phenol ("4-tert-octyl phenol"), allyl phenol and cumyl phenol are the most preferred. Addition of a chain terminator is made to the reaction mixture after a carbonate precursor is completely reacted with a dihydroxy compound.

The intermediate carbonate oligomers formed by the process as described above dissolve in the organic solvent as they form, and they can be condensed to a higher molecular weight, final polycarbonate product by contact with a coupling catalyst of which the following are representative: a tertiary amine such as triethyl amine or an activated pyridine, for example a 2- or 4-substituted pyridine such as 4-dimethylaminopyridine; a hindered secondary amine such as diisopropyl amine; a cyclic aza compound such as 2,2,6,6-tetramethyl piperidine or 1,2-dimethylimidazole: an amidine or aminoamidine compound such as 1-methyl-2-phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butyl-cyclohexyliminoacetate; or a phosphonium, sulfonium, arsonium or quaternary ammonium compound.

Upon completion of polymerization, the organic and aqueous phases are separated to allow purification of, and recovery of the polycarbonate product from, the organic phase. The organic phase is washed as needed in a centrifuge with water, dilute base and/or dilute acid until free of unreacted monomer, residual process chemicals and/or other electrolytes. Recovery of the polycarbonate product from the organic phase can be effected by spray drying, steam devolatilization, direct devolatilization in a vented extruder, or precipitation by use of an anti-solvent such as toluene, cyclohexane, heptane, methanol, hexanol, or methyl ethyl ketone.

The reaction can be run at a temperature between 0° C.–100° C., although usually not in excess of the boiling point of the solvent used. Frequently, the reaction is run at a temperature of about 0° C. to about 45° C.

Representative examples of dihydroxy compounds suitable for use in the preparation of a polycarbonate include one or more of the variously bridged aromatic diols represented generally by the formula

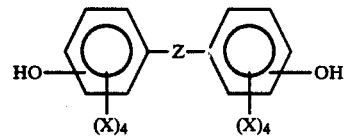

wherein:

(I) Z is (A) a divalent radical, of which all or different portions can be (i) linear, branched, cyclic or bicyclic, (ii) aliphatic or aromatic, and/or (iii) unsaturated, said divalent radical being composed of 1-35 carbon atoms together with up to five oxygen, nitrogen, sulfur, phosphorus and/or halogen (such as fluorine, chlorine and/or bromine) atoms; or (B) S, $S_2$, SO, $SO_2$, O or CO; or (C) a single bond: and (II) each X is independently hydrogen, a halo radical (such as fluroine, chlorine and/or bromine), or a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example the bridge represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$, $CCl_3$, $CF_2Cl$, CN, $(CH_2)_2COOCH_3$, or $PO(OCH_3)_2$.

The polycarbonate of the present invention can also be prepared from dihydroxy benzenes such as pyrocatechol, resorcinol and hydroquinone, and from dihydroxy naphthalenes and anthracenes, and their halo-, alkyl- and aryl-substituted derivatives.

Representative dihydroxy compounds of particular interest in this invention include the following: bis(4-hydroxyphenyl)sulphone, bis(3-hydroxyphenyl)sulphone,
bis(2-hydroxyphenyl)sulphone,
bis(4-hydroxyphenyl)ketone,
bis(4-hydroxyphenyl)methane,
1,1-bis(4-hydroxyphenyl)propane,
1,1-bis(4-hydroxyphenyl)butane,
1,1-bis(4-hydroxyphenyl)heptane,
1,1-bis(4-hydroxyphenyl)cyclopentane,
1,1-bis(4-hydroxyphenyl)cyclohexane,
2,2-bis(4-hydroxyphenyl)propane,
bis(hydroxyphenyl)fluorene,
1-phenyl,1,1-bis(4-hydroxyphenyl)ethane, ("Bisphenol-AP)
2,2-bis(3,5-dibromo,4-hydroxyphenyl) propane ("Tetrabromo Bisphenol-A" or "TBBA"),
2,2-bis(3,5-dichloro,4-hydroxyphenyl) propane ("Tetrachloro Bisphenol-A"), and
2,2-bis(3,5-dimethyl,4-hydroxyphenyl) propane ("Tetramethyl Bisphenol-A");
and the like. Among these, 2,2-bis(4-hydroxyphenyl)propane ("Bisphenol-A") is especially preferred.

Known processes for preparing polycarbonate are described generally in Schnell, U.S. Pat. No. 3,028,365; Campbell, U.S. Pat. No. 4,384,108; Glass, U.S. Pat. No. 4,529,791; and Grigo, U.S. Pat. No. 4,677,162, each being incorporated herein in its entirety.

The preferred process of this invention is that in which an aromatic polycarbonate is prepared. An aromatic polycarbonate is defined herein with reference to the oxygen atoms, of the dihydroxy compounds present in the copolycarbonate chain, which are bonded to a carbonyl carbon. In an aromatic polycarbonate, all such oxygen atoms are bridged by a dihydroxy compound residue some part of which is an aromatic ring.

In a preferred embodiment of the process of this invention, the reaction is conducted independently in a series of individual reaction vessels wherein at least a portion of the reaction mixture prepared in a first reaction vessel in a first step is transferred to a second reaction vessel wherein another step is performed thereon, and so on throughout the process whereby other later steps can, if desired, be performed in other vessels.

Carbonate byproducts typically result when a chain terminator is charged to a monomer mix before a carbonic acid derivative has been fully reacted therein with a dihydroxy compound. Any terminator anion capable of attacking an hydroxy or carbonic acid ester end group on a completed polymer chain is also capable of undesirably either (1) attacking unreacted molecules of the initial charge of the carbonic acid derivative, or (2) displacing end group before a chain has an opportunity to grow to the desired length. The practice of adding chain terminator to a reaction mixture prior to complete reaction of the carbonic acid derivative consequently allows the formation of carbonate byproducts by the occurrence of both of the aforesaid results.

Different carbonate byproducts can result during the manufacture of polycarbonate, two of those more commonly encountered being monocarbonate and dicarbonate. For example, when a dihydroxy compound, an unreacted carbonic acid derivative and a chain terminator are simultaneously present in the monomer mix, a side reaction directly between two equivalents of chain terminator and the carbonic acid derivative can yield monocarbonate. Monocarbonate contains one carbonyl carbon bonded to the residue of two equivalents of terminator, but contains no dihydroxy compound residue. Correspondingly, dicarbonate results when two equivalents of carbonic acid derivative have been coupled by a dihydroxy compound but then have each been stopped from further such chain growth by terminator. Dicarbonate contains one terminator residue and a carbonyl carbon and linked to a second carbonyl carbon/terminator unit by a dihydroxy compound residue.

When a dihydroxy compound, an unreacted carbonic acid derivative and, for example, a phenolic chain terminator are simultaneously present in the monomer mix, carbonate byproducts which can result may be generally represented by a formula such as

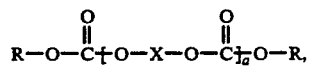

where R is the ring portion of the phenolic terminator, and X is the bridging portion of the dihydroxy compound; a=0 gives monocarbonate, and a=1 gives dicarbonate. Certain values of a greater than 1 can also represent carbonate byproducts.

Because of the desire to prevent, inhibit or reduce the formation of carbonate byproducts, the process of this invention involves the practice of withholding addition of chain terminator to a polycarbonate reaction mixture until reaction of the carbonic acid derivative with the dihydroxy compound has proceeded to completion. This reaction occurs very quickly, and can be regarded as substantially complete as soon as the carbonic acid derivative has been thoroughly admixed with the other components of the reaction mixture. When carbonic acid derivative is present in the reaction mixture in the preferred amount of about 1.15 to about 1.5 moles, and more preferably about 1.2 to about 1.3 moles, of carbonic acid derivative per mole of dihydroxy compound, the reaction can be regarded as substantially instantaneous.

If desired, a test can be run to determine the amount of unreacted dihydroxy compound remaining in the aqueous phase of the reaction mixture. If sufficient dihydroxy compound has been consumed, according to the relative amounts of dihydroxy compound and carbonate precursor present in the monomer mix, the completion of reaction of all, or substantially all, of the carbonic acid derivative can be determined. For example, if about 1.15 to about 1.5 moles of carbonic acid derivative per mole of dihydroxy compound is present in the reaction mixture, a dihydroxy compound content in the aqueous phase of less than 2 weight percent, and preferably less than 1,000 weight parts per million, indicates substantial completion of the reaction of the carbonic acid derivative.

When a terminator is not present in the reaction mixture before completion of reaction of the carbonic acid derivative, premature attack by the terminator on the unreacted portion of a carbonic acid derivative is not possible, thereby preventing or reducing the formation the formation of carbonate by products.

As important as it is to follow this practice to reduce carbonate byproduct content, it is also desirable to follow additional process steps which (i) reduce the pre-coupling molecular weight of the intermediate carbonate oligomers, (ii) reduce the polydispersity of the final, polycarbonate product, as well as (iii) enhance the likelihood that the formation of carbonate byproducts, particularly dicarbonate, will be reduced.

To help reduce the molecular weight of the intermediate carbonate oligomers before they are condensed into a final, high molecular weight polycarbonate product, base is added to the monomer mix before completion of reaction of the carbonic acid derivative, and preferably before the carbonic acid derivative is itself added to the mixture, in an amount per mole of dihydroxy compound given by $2+4Y(Z-1)$ where $Y=$ about 0 to about 0.5, and preferably about 0.2 to about 0.4, and $Z=$ moles of carbonic acid derivative per mole of dihydroxy compound. Running the reaction in a highly agitated state and with excess water, for example in excess of 8 moles of water per mole of dihydroxy compound, also has the effect of reducing the molecular weight of the intermediate carbonate oligomers.

To help reduce the polydispersity of the final, high molecular weight polycarbonate product, a chain terminator is added to, thoroughly admixed with and preferably substantially completely reacted with the reaction mixture, before a coupling catalyst is added thereto. If desired, an analytical test such as liquid chromatography can be run to determine the amount of unreacted terminator remaining in the reaction mixture. When such a test shows substantial absence of the terminator from the reaction mixture, or shows a constant level thereof has been reached, substantially complete reaction of the terminator in the reaction mixture has been reached. Polydispersity control is likewise aided if further base is also added to the reaction mixture after the chain terminator has been thoroughly admixed and reacted therewith. Base should be added at such point in the reaction in an amount sufficient to impart to the reaction mixture a negative chloroformate test. For example, one known such test involves the use of 4(4-nitrobenzyl)pyridine, which turns orange in the presence of chloroformates.

The value of these process steps may be noted not only in a desirably low amount of carbonate byproducts in the polycarbonate produced thereby, but also in a low pre-coupling molecular weight for the intermediate carbonate oligomers, and a low polydispersity (weight average molecular weight divided by number average molecular weight) in the final polycarbonate product. A polycarbonate made by the process of this invention is characterized by (i) a monocarbonate content of less than 100, and preferably less than 50, parts by weight per million parts of polycarbonate ("ppm"), (ii) less than 0.8 percent, and preferably less than 0.6 percent, of dicarbonate, based on the weight of the polycarbonate, and (iii) a polydispersity of less than 3.0 and preferably less than 2.5. Before coupling, a polycarbonate oligomer made by the process of this invention is characterized by a weight average molecular weight of about 1,500 to about 8,000 and preferably about 1,500 to about 4,000.

A branched rather than linear polycarbonate molecule can be obtained by adding to the reaction mixture a tri- or polyfunctional monomer such as a tri- or tetrafunctional phenol or carboxylic acid (or derivative thereof such as an acyl halide or anhydride), a bisphenol containing carboxylic acid side groups, or a nitrogen-containing compound such as cyanuric chloride, or compounds containing a mixture of such groups.

Instead of a polycarbonate, a carbonate copolymer (a copolycarbonate) can be prepared by incorporating into the reaction mixture two or more different dihydroxy compounds, which can be charged to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate. When a dicarboxylic acid (or derivative) or a hydroxycarboxylic acid is used in the reaction mixture, or to form an oligomeric prepolymer, instead of one of the different dihydroxy compounds, a poly(ester/carbonate) is obtained instead of a polycarbonate.

A copolycarbonate can also be prepared by reaction of a dihydroxy compound, and optionally one or more other dihydroxy compounds, with a carbonate precursor and, for example, the following; a hydroxy-terminated poly(phenylene oxide) or poly(methyl methacrylate), a phosphonyl dichloride, or an aromatic ester of a phosphonic acid, or by reaction in the presence of a chlorine- or amino-terminated polysiloxane. Siloxane/carbonate block copolymers are discussed in greater detail in Paul, U.S. Pat. No. 4,596,970 and poly(ester/carbonate)s are discussed in greater detail in Swart, U.S. Pat. No. 4,105,533, each being incorporated herein in its entirety.

Polycarbonate blends can be prepared from a polycarbonate by admixing two or more different polycarbonates; or by admixing a polycarbonate with one or more other kinds of carbonate polymers, such as an alternating or block copolycarbonate, a homopolycarbonate (being that which is prepared from only one dihydroxy compound), or a poly(ester/carbonate); and/or with one or more other kinds of polymers or copolymers, such as polyethylene, polyester, polyacetal, polyamide, polysulfone, poly(phenylene oxide), acrylonitrile/butadiene/styrene copolymer, methacrylate/butadiene/styrene copolymer, and/or styrene/maleic anhydride copolymer.

The process of this invention can further involve compounding with a polycarbonate conventional thermoplastic polymer additives which include, but are not limited to, fillers, thermal stabilizers, dyes, flame retarding agents, reinforcing agents, softeners, mold-release agents, seed-forming agents, pigments, plasticizers, antistatic agents, UV absorbers, lubricants, compatibilizers, and the like, in conventional amounts generally not exceeding 25 percent, and preferably not exceeding 5 percent, by weight of the total composition.

ILLUSTRATIVE EMBODIMENTS

To illustrate the practice of this invention, examples of preferred embodiments are set forth below. It is not intended, however, that these examples (Examples 1-2) should in any manner restrict the scope of this invention. Some of the particularly desirable features of this invention may be seen by contrasting the characteristics of Examples 1-2 with those of controlled processes (Controls A and B) which do not possess the features of, and are not therefore embodiments of, this invention.

Control A 550 grams of Bisphenol-A are added to 2,700 grams of water, 570 grams of 34% NaOH and 2,250 grams of methylene chloride in a 2 gallon phosgenation reactor. The mixture is stirred to dissolve the Bisphenol-A, and phosgene addition is started at a rate of 3 grams/minute. After 150 grams of phosgene has been added, 200 grams of 34% NaOH is added and phosgenation is continued. A total of 300 grams of phosgene is added. After phosgenation is complete, 17.6 grams of p-tertiarybutyl phenol ("PTBP") is added. After thorough admixture of the PTBP with the other reaction components, the phosgenated oligomers are transferred to a 3 gallon coupling reactor containing 3,625 grams of methylene chloride, 100 grams of 34% NaOH and 2.8 grams of triethylamine ("TEA"). The mixture is stirred to the end of the polycarbonate-forming reaction as indicated by a negative chloroformate test.

Control B

The same process as described in Control A is performed except that the PTBP is present in the coupling reactor when the phosgenated oligomers are added thereto.

EXAMPLE 1

700 grams of Bisphenol-A are added to 3,300 grams of water, 780 grams of 34% NaOH and 2,700 grams of methylene chloride in a 2 gallon phosgenation reactor. The mixture is stirred to dissolve the Bisphenol-A, and phosgene addition is started at a rate of 4 grams/minute. A total of 372 grams of phosgene is added. After phosgenation is complete, 19 grams of PTBP is added. After thorough admixture of the PTBP with the other reaction components, the phosgenated oligomers are transferred to a 3 gallon coupling reactor containing 4,680 grams of methylene chloride, 650 grams of 34% NaOH and 3.6 grams TEA. The mixture is stirred to the end of the polycarbonate-forming reaction as indicated by a negative chloroformate test.

EXAMPLE 2

68.5 grams of Bisphenol-A are added to 360 grams of water and 88 grams of 34% NaOH in a 1 liter phosgenation reactor. The mixture is stirred to dissolve the Bisphenol-A, and phosgene addition is started at a rate of 1 gram/minute. A total of 49 grams of phosgene is added. After phosgenation is complete, 570 grams of methylene chloride are added to dissolve the white oligomer precipitate. After thorough stirring, 2.2 grams of PTBP are added, followed by 66 grams of 34% NaOH. After thorough admixture of the PTBP with the other reaction components, 0.38 grams of TEA is added. The mixture is stirred to the end of the polycarbonate-forming reaction as indicated by a negative chloroformate test.

Each of the polycarbonates prepared by the processes of Controls A and B and Examples 1-2 is analyzed to determine mono- and dicarbonate content, weight average and number average molecular weight, and polydispersity. The oligomers produced by each process are also tested for molecular weight before coupling.

Weight and number average molecular weight determinations are performed by gel permeation chromatography ("GPC") using a Bisphenol-A polycarbonate standard.

Measurement of the quantity of mono- and dicarbonate in the polycarbonate samples made in each process was accomplished by high-performance reverse-phase liquid chromatography. The samples were analyzed on a Hewlett Packard 1090 chromatograph, using a 15 cm×4 mm I.D. column, packed with Spherisorb ODS II three micron packing. Tetrahydrofuran/$H_2O$ was used as the carrier solvent. UV absorbtion at 264±5 nm was determined for each oligomer as it eluted from the column. Absorbtion peaks were compared to those generated by standardization samples containing carefully measured amounts of mono- and dicarbonate. A monocarbonate content of less than 50 ppm is not detectable by this method of measurement, and as monocarbonate is not detected in any of these samples, each is deemed to have less than 50 ppm monocarbonate.

Moles of NaOH per mole of dihydroxy compound ("DHC") added before completion of phosgenation, dicarbonate content, molecular weights and polydispersity are reported in Table I for the polycarbonates prepared by each of the processes of Controls A and B and Examples 1-2.

TABLE I

| Polycarbonate Produced by the Process of | Results of Tests on Samples from Controls A-B and Examples 1-2 | | | | | Dicarbonate Content, weight percent |
|---|---|---|---|---|---|---|
| | Moles of NaOH per mole of DHC | Pre-Coupling Weight Average Molecular Weight | Coupled Molecular Weight | | Poly-dispersity | |
| | | | Weight | Number | | |
| Control A | 2.7 | 9,619 | 20,981 | 7,743 | 2.7 | 1.1 |
| Control B | 2.7 | — | 29,979 | 7,913 | 3.8 | 0.2 |
| Example 1 | 2.2 | 4,050 | 24,860 | 9,438 | 2.6 | 0.30 |
| Example 2 | 2.46 | 1,514 | 21,186 | 9,144 | 2.3 | 0.1 |

The results of the foregoing tests demonstrate the value of following the additional steps of this invention when seeking to reduce carbonate byproduct formation by withholding chain terminator addition until after phosgenation. In the process of Control A, more base was added to the reaction mixture before completion of phosgenation per mole of dihydroxy compound than given by $2+4Y(Z-1)$ where Y=about 0 to about 0.5 and Z=moles of carbonic acid derivative per mole of dihydroxy compound. This resulted in a polycarbonate product having an undesirably high dicarbonate content. In the process of Control B, more base was added to the reaction mixture before completion of phosgenation per mole of dihydroxy compound than given by the above equation, and the chain terminator was not added and thoroughly admixed with the other reaction components before the coupling catalyst was added. This resulted in a polycarbonate product having an undesirably high polydispersity.

In the respective processes of Examples 1-2, which illustrate this invention, the base added to the reaction mixture before completion of phosgenation meets the above equation, and the chain terminator was added and thoroughly admixed with the other reaction components before the coupling catalyst was added. This resulted, respectively, in polycarbonate products having both a desirably low polydispersity and dicarbonate content.

What is claimed is:

1. A process for preparing polycarbonate comprising
    (a) forming a carbonate oligomer by contacting a carbonyl halide with a dihydroxy compound dianion in a reaction mixture containing water, a solvent capable of dissolving a carbonyl halide, and a base in an amount per mole of dihydroxy compound given by $2+4Y(Z-1)$ moles where $Y=$ about 0 to about 0.5 and $Z=$ about 1.15 to about 1.5, (b) admixing a chain terminator with said reaction mixture after said carbonyl halide has been substantially completely reacted with said dianion of said dihydroxy compound in said reaction mixture, (c) forming a polycarbonate by admixing a carbonate oligomer condensation catalyst with said reaction mixture after said chain terminator has been substantially completely reacted with said reaction mixture, (d) recovering a polycarbonate produce from said reaction mixture.

2. The process of claim 1 further comprising admixing with said reaction mixture, after said chain terminator has been substantially completely reacted with said reaction mixture, sufficient base to impart to said reaction mixture a negative chloroformate test.

3. The process of claim 1 wherein said polycarbonate preparation process is conducted in a series of individual reaction vessels wherein a carbonyl halide is contacted with a dihydroxy compound dianion in the reaction mixture in step (a) in a first reaction vessel, and at least one of steps (b) or (c) is performed on said reaction mixture in a second reaction vessel.

4. The process of claim 1 further comprising admixing a dicarboxylic acid, or derivative thereof, or a hydroxycarboxylic acid with said reaction mixture in step (a).

5. The process of claim 1 wherein said dihydroxy compound is one or more of the members of the group consisting of Bisphenol-A, Tetrabromobisphenol-A, Tegtramethylbisphenol-A, Bisphenyl-A-P, and Bis(hydroxyphenyl)fluorene, and the chain terminator is phenol or a substituted derivative thereof.

6. The process of claim 1 wherein $Z=$ about 1.2 to about 1.3.

7. The process of claim 1 wherein the amount of water in step (a) is in excess of 8 moles per mole of dihydroxy compound.

8. The process of claim 7 further comprising admixing with said reaction mixture, after said chain terminator has been substantially completely reacted with said reaction mixture, sufficient base to impart to said reaction mixture a negative chloroformate test.

9. The process of claim 1 wherein the carbonate oligomer has a weight average molecular weight of about 1,500 to 8,000.

10. The process of claim 9 further comprising admixing with said reaction mixture, after said chain terminator has been substantially completely reacted with said reaction mixture, sufficient base to impart to said reaction mixture a negative chloroformate test.

* * * * *